US012649147B2

(12) United States Patent
Bachman

(10) Patent No.: US 12,649,147 B2
(45) Date of Patent: Jun. 9, 2026

(54) ADSORBENT AEROGEL MEMBRANE SHEETS FOR DIRECT AIR CAPTURE OF CO₂

(71) Applicant: PALO ALTO RESEARCH CENTER INCORPORATED, Palo Alto, CA (US)

(72) Inventor: Jonathan Bachman, Fremont, CA (US)

(73) Assignee: XEROX CORPORATION, Norwalk, CT (US)

( * ) Notice: Subject to any disclaimer, the term of this patent is extended or adjusted under 35 U.S.C. 154(b) by 848 days.

(21) Appl. No.: 17/871,131

(22) Filed: Jul. 22, 2022

(65) Prior Publication Data

US 2024/0024852 A1 Jan. 25, 2024

(51) Int. Cl.
| | |
|---|---|
| *B01J 20/28* | (2006.01) |
| *B01D 53/02* | (2006.01) |
| *B01J 20/26* | (2006.01) |
| *B01J 20/32* | (2006.01) |

(52) U.S. Cl.
CPC ........ B01J 20/28047 (2013.01); B01D 53/02 (2013.01); B01J 20/267 (2013.01); B01J 20/2804 (2013.01); B01J 20/28042 (2013.01); B01J 20/28052 (2013.01); B01J 20/28064 (2013.01); B01J 20/28076 (2013.01); B01J 20/3225 (2013.01); B01D 2253/202 (2013.01); B01D 2253/25 (2013.01); B01D 2253/306 (2013.01); B01D 2253/342 (2013.01); B01D 2257/504 (2013.01); B01D 2258/0283 (2013.01)

(58) Field of Classification Search
CPC ............... B01J 20/28047; B01D 53/02; B01D 2257/504
See application file for complete search history.

(56) References Cited

U.S. PATENT DOCUMENTS

| | | | | |
|---|---|---|---|---|
| 2019/0106543 A1* | 4/2019 | Chintapalli | ............. | C08L 33/10 |
| 2023/0201800 A1* | 6/2023 | Snapp-Leo | ............ | A41D 13/11 |
| | | | | 422/4 |
| 2023/0398515 A1* | 12/2023 | Konstas | ............ | B01J 20/28057 |

FOREIGN PATENT DOCUMENTS

JP 2004517222 A * 6/2004

* cited by examiner

*Primary Examiner* — Robert Clemente
(74) *Attorney, Agent, or Firm* — Miller Nash LLP

(57) ABSTRACT

A polymer aerogel monolith comprising a polymer aerogel having a nitrogen content of greater than seven weight percent impregnated into a mesh. A method of manufacturing an amine-containing polymer aerogel monolith, includes combining a vinyl-containing cross-linking monomer, a vinyl-containing functional monomer, an organic solvent, and a radical initiator into a liquid mixture, applying the liquid mixture to a mesh fabric to produce a monomer-impregnated mesh, heating the monomer-impregnated mesh to produce a polymer aerogel monolith, washing the polymer aerogel monolith with acid to produce an ammonium-containing polymer aerogel monolith, and applying a base to neutralize the ammonium-containing polymer aerogel monolith to produce an amine-containing polymer aerogel monolith. A direct air capture module has one or more amine-containing polymer aerogel monoliths, one or more air flow channels positioned to pass air through the monolith A monolith comprising a poly(alkylamine-co-divinylbenzene) impregnated mesh.

11 Claims, 12 Drawing Sheets

ADSORBENT AEROGEL MEMBRANE SHEETS FOR DIRECT AIR CAPTURE OF CO₂

GOVERNMENT RIGHTS

This invention was made with government support under Award No. DE-FE0031951 awarded by the US Department of Energy. The government has certain rights in the invention.

TECHNICAL FIELD

This disclosure relates to polymer aerogels, more particularly to nitrogen-based polymer aerogels in membrane form.

BACKGROUND

Conventional adsorbent materials take a powder or pellet form factor usable in packed-bed type adsorption systems. Direct air capture systems typically cannot use these form factors because of the low pressure of the incoming air. Air contactors incorporating an adsorbent typically results from applying the adsorbent material directly to a membrane, usually from a carrier solvent. This poses major problems when one considers the longevity of the adsorbent material.

If the adsorbent adheres directly to the air contactor, one cannot replace the adsorbent and the end of its life. Instead, this type of contactor requires replacement of the entire contactor to replace the adsorbent. This is neither cost-effective nor efficient.

SUMMARY

According to aspects illustrated here, there is provided a polymer aerogel monolith, comprising a polymer aerogel having a nitrogen content of greater than seven weight percent impregnated into to a mesh.

According to aspects illustrated here, there is provided a method of manufacturing an amine-containing polymer aerogel monolith, that includes combining a vinyl-containing cross-linking monomer, a vinyl-containing functional monomer, an organic solvent, and a radical initiator into a liquid mixture, applying the liquid mixture to a mesh fabric to produce a monomer-impregnated mesh, heating the monomer-impregnated mesh to produce a polymer aerogel monolith, washing the polymer aerogel monolith with acid to produce an ammonium-containing polymer aerogel monolith, and applying a base to neutralize the ammonium-containing polymer aerogel monolith to produce an amine-containing polymer aerogel monolith.

According to aspects illustrated here, there is provided a direct air capture module that has one or more amine-containing polymer aerogel monoliths, one or more air flow channels positioned to pass air through the monolith.

According to aspects illustrated here, there is provided a monolith comprising a poly(alkylamine-co-divinylbenzene) impregnated mesh.

According to aspects illustrated here, there is provided A method for capturing CO₂, including providing a poly(alkylamine-co-divinylbenzene) impregnated mesh, exposing the poly(alkylamine-co-divinylbenzene) impregnated mesh to a gas stream comprising CO₂, causing adsorption of CO₂ to the polymer, and desorbing the CO₂ from the poly(alkylamine-co-divinylbenzene) impregnated mesh.

DETAILED DESCRIPTION OF THE EMBODIMENTS

Figure 1:
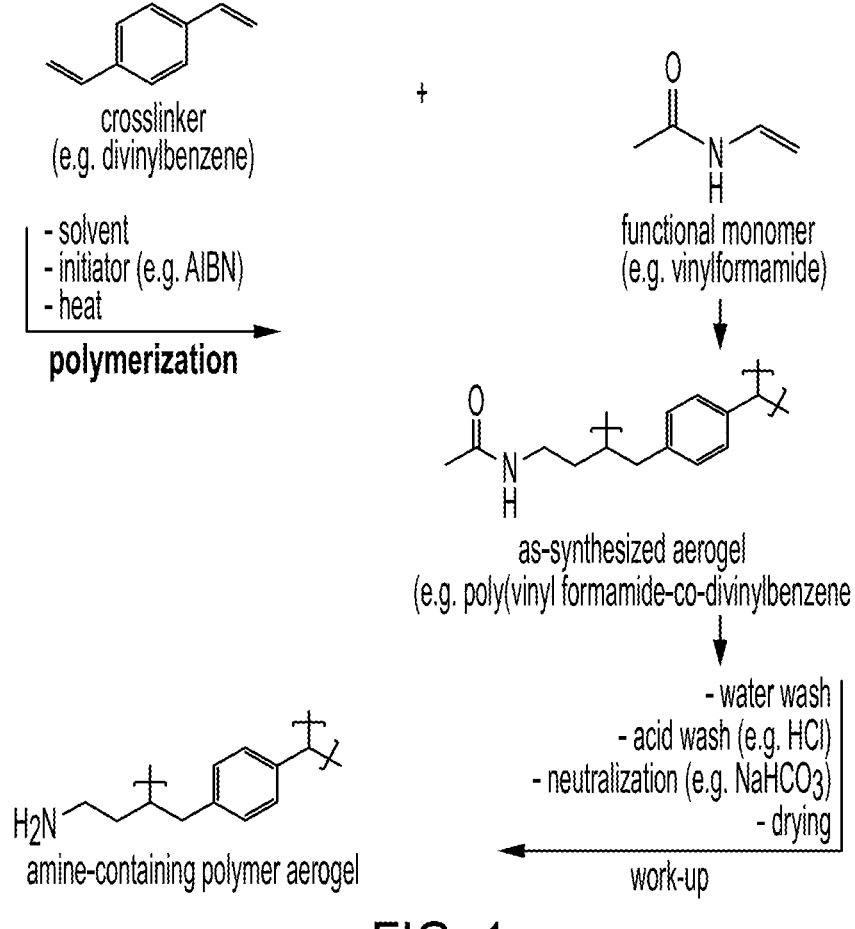
FIGS. 1-2 show an embodiment of a method of manufacturing an amine-containing polymer aerogel monolith.

The embodiments here involve a method and structure to separate CO₂ from a gas mixture, usable in direct air capture (DAC), post-combustion capture, CO₂ removal from natural gas, or CO₂/H₂ separation. In the application of DAC, air flows through a contactor device. The adsorption system in the contactor should have a minimal pressure drop. The embodiments here have a sheet, membrane or monolith form factor, which works well in direct air capture applications. The embodiments include the fabrication of adsorbents as a sheet. This enables robust and efficient adsorption systems for direct air capture.

In current approaches, structured adsorbent systems apply the adsorbent to a substrate via coating a substrate with the adsorbent, such as by wash-coating a substrate with a powder. Conventional adsorbent materials require wash-coating because those materials cannot be formed as structured adsorbents on their own. This leads to a large mass fraction of non-active material in the contactor, increasing the sensible heat requirement and cost of contactor manufacturing. Current approaches have also focused on impregnating silica or alumina monoliths with amine-containing polymers; such monoliths are difficult to manufacture at the scales needed for DAC. In these approaches, the amine-containing polymers are not intrinsically porous and rely on the porosity of the supporting material, be it monolith or membrane, to enable efficient integration of the sorbent with gas. Herein, porosity is introduced into the material during the formation of the polymer containing the amine or amine-precursor.

The approach of the present application uses radical polymerization. The radical polymerization platform offers the opportunity to fabricate the sorbent material as a structured adsorbent, as it is a monolithic aerogel. Impregnating a mesh with the monomer mixture and polymerizing yields a flexible, structured aerogel. In some embodiments, the structured aerogel has a bend radius of less than 5 cm, less than 3 cm, less than 2 cm, less than 1 cm, less than 8 mm, less than 6 mm, less than 5 mm, or less than 3 mm, above which the structured aerogel does not break upon bending. In this embodiment, in contrast to other implementations, the sorbent material is intrinsically porous, with pores on the 1-100 nm length scale, in addition to optional macroporosity at larger length scales, such as the pore size of the supporting mesh (typically on the 1 micron to 1 mm or greater length scale). Brunauer Emmett Teller (BET) surface areas between 10 and 800 $m^2/g$ are typical (including above 10 $m^2/g$, above 20 $m^2/g$, above 30 $m^2/g$, above 40 $m^2/g$, above 50 $m^2/g$, above 60 $m^2/g$, above 80 $m^2/g$, above 100 $m^2/g$, 200 $m^2/g$, 500 $m^2/g$, 600 $m^2/g$, 700 $m^2/g$). Porosities of above 5 v % (volume percent), 10 v %, 20 v %, 30 v %, 40 v %, 50 v %, and 60 v % are possible.

This allows formation of the structured adsorbent directly as a free-standing, flexible, intrinsically porous amine-containing polymer aerogel monolith in the form of low-cost adsorbent 'sheets' that can be readily assembled into a DAC module to achieve the project goals. The incorporation of a reinforcement material, initially in the form of a non-woven polymer filter, provides exceptional mechanical stability to the reinforced, as-synthesized polymer aerogel monolith. The reinforced, as-synthesized polymer aerogel monolith will not crack or flake upon bending, unlike the non-reinforced monolith. Importantly, these impressive mechanical properties are achieved with a reinforcement material content of less than 15 wt %, substantially less than what is used in alternative supported amine structured adsorbent monoliths, which is usually 50-75%. In alternate embodiments, the reinforcement material content can be below 50 wt %, 40 wt %, 30 wt %, 20 wt %, 10 wt %, 5 wt %, or 1 wt %. In some embodiments, the thickness of the mesh support is less than 500 micrometers, less than 400 micrometers, less than 300 micrometers, less than 200 micrometers, or less than 100 micrometers.

The mesh support may be composed of a polymer, inorganic material such as silica or alumina fibers, or metal. The mesh may be produced through any means of creating a porous membrane, including but not limited to weaving, knitting, film-expansion, felting, drying and vacuum drying of fibers, or other means. The mesh may be produced by series of steps consisting of forming a fibrous web, entangling, or bonding the fibers in the web to impart mechanical integrity to the structure and finishing/converting the fabric. The mesh may have a surface treatment to encourage wetting of the sorbent precursor solution. In some embodiments, the mesh is a non-woven filter media. In some embodiments, the non-woven filter is an airlaid, wetlaid, spunlaid, spunbound, spunlace, meltblown, or thermobonded non-woven filter. In some embodiments, the non-woven filter is produced via needlepunching or hydroentanglement. In one embodiment, the mesh is non-woven polypropylene. In another embodiment, the mesh is non-woven Nylon. In another embodiment, the mesh is non-woven polyethylene terephthalate (PET). In another embodiment, the mesh is non-woven cellulose. In another embodiment, the mesh is non-woven Rayon.

A first embodiment comprises a polymer aerogel monolith. The polymer aerogel has a nitrogen content of greater than seven weight percent impregnated into to a mesh fabric. In one embodiment, the polymer aerogel monolith 10 results from a process of manufacturing shown in FIG. 1. The embodiment comprises combining a vinyl-containing crosslinking monomer, a vinyl-containing functional monomer, an organic solvent, and a radical initiator into a liquid mixture. In one embodiment, the vinyl-containing crosslinking monomer comprises divinylbenzene, and the vinyl-containing functional monomer comprises vinylformamide.

The vinyl group may be an ordinary vinyl group, or part of a larger vinyl-containing structure such as a styrenic monomer, acrylate, or methacrylate. In other embodiments, the vinyl containing crosslinker may be pentaerythritol tetraacrylate, pentaerythritol tetramethacrylate, pentaerythritol triacrylate, pentaerythritol trimethacrylate, polyoligosilsesquioxane acrylate, methacrylate, or vinyl derivatives, trimethylolpropane triacrylate, trimethylolpropane trimethacrylate, dipentaerythritol penta-acrylate, dipentaerythritol penta-methacrylate, dipentaerythritol hexa-acrylate, dipentaerythritol hexa-methacrylate, hexanedioldiacrylate, hexanediol-dimethacrylate, vinyl-containing crosslinkers derived from adamantane, di(trimethylolpropane) tetraacrylate, di(trimethylolpropane) tetramethacrylate, or any molecule containing two or more vinyl groups.

The vinyl-containing functional monomer may be a molecule with an amine group (primary, secondary, tertiary or quaternary), or a precursor to an amine group such as an amide group. Other examples are 4-vinylaniline, 3-vinylaniline, vinylaniline, N,N-dimethylvinylbenzylamine and its isomers, 4-[N-(Methylaminoethyl)aminomethyl]styrene, and allylamine. In some embodiments, it is beneficial for the vinyl-containing functional monomer to have a low molecular weight, in order for the functional group content in the material to be maximized on a per-mass basis. In such embodiments, the vinyl-containing functional monomer should have molecular weight below 60 g/mol, 75 g/mol, 90 g/mol, 100 g/mol, 110 g/mol, or below 120 g/mol.

If the vinyl-containing functional monomer is a precursor to an amine group, then the molecular weight of the functional monomer should be considered for the theoretical, unpolymerized amine-form of the monomer. Alternately, the vinyl-containing functional monomer should have a number of carbon atoms below 8, below 7, below 6, below 5, or below 4, where the vinyl functionality is included in the number of carbon atoms.

The solution may also include a solvent, in one embodiment the solvent may comprise N-methylpyrrolidone, dimethylformamide, benzene, xylenes, toluene, 1,4-dioxane, chlorobenzene, mesitylene, ethylbenzene, hexanes, heptanes, cyclohexanes, or other organic solvents.

The radical initiator may comprise a thermal initiator or a photo initiator. In one embodiment, the initiator comprises a thermal initiator, such as AIBN (azobisisobutyronitrile), benzoyl peroxide, lauroyl peroxide, dicumyl peroxide, tertbutylperoxide, azobiscyclohexanecarbonitrile, azobiscyanovaleric acid, or others. In the case of using a photoinitiator, light in the appropriate wavelength to decompose the initiator is applied to the precursor solution, or a combination of light and heat.

In some embodiments, the reinforced polymer aerogel monolith comprises greater than seven weight percent amine, greater than ten weight percent amine, greater than fifteen weight percent amine, greater than twenty weight percent amine, greater than twenty five weight percent amine, greater than thirty weight percent amine, greater than thirty five weight percent amine, greater than forty weight percent amine, greater than forty five weight percent amine, greater than fifty weight percent amine, greater than fifty five weight percent amine, greater than sixty weight percent amine, greater than sixty five weight percent amine, or greater than seventy weight percent amine. In some embodiments, the reinforced polymer aerogel monolith contains greater than 5 mmol N/g, greater than 6 mmol N/g, greater than 7 mmol N/g, greater than 8 mmol N/g, greater than 9 mmol N/g, greater than 10 mmol N/g, greater than 11 mmol N/g, greater than 12 mmol N/g, by elemental analysis of its carbon, hydrogen, and nitrogen content.

One distinguishing feature of this embodiment is the incorporation of the vinyl-containing functional monomer during the polymerization step, instead of through a post-polymerization functionalization process. This approach leads to significant improvements in specific adsorption capacity, such as above 0.36 mmol/g, 0.9 mmol/g, 1.4 mmol/g, 1.7 mmol/g, 2.0 mmol/g, 2.5 mmol/g, above 2.7 mmol/g, 3 mmol/g, 3.2 mmol/g, or 3.4 mmol/g when measured at 400 ppm $CO_2$, or near-400 ppm, e.g. 426 ppm, or between 350 and 450 ppm, in a different carrier gas or carrier gas mixture, e.g. air, $N_2$, or Ar, at near-ambient temperature, e.g. 20° C., 25° C., 30° C., where the mass of sorbent is taken to be the dry mass of the sorbent. The measurement can be conducted in a dry or humidified environment such as 0% RH (relative humidity), 25% RH, 50% RH, 75% RH, or 90% RH.

The liquid mixture is applied to a mesh fabric to impregnate the monomer liquid into the fabric. The fabric may take one of many forms, may be woven or non-woven, polymeric, ceramic, or metal. The monomer-impregnated mesh then undergoes heating, in this embodiment, to produce an as-synthesized polymer aerogel monolith. The process further involves washing the polymer aerogel monolith with acid to produce an ammonium-containing polymer aerogel monolith. A base is then applied to neutralize the ammonium-containing polymer aerogel monolith to produce an amine-containing polymer aerogel monolith. The resulting monolith is then dried.

Figure 2:
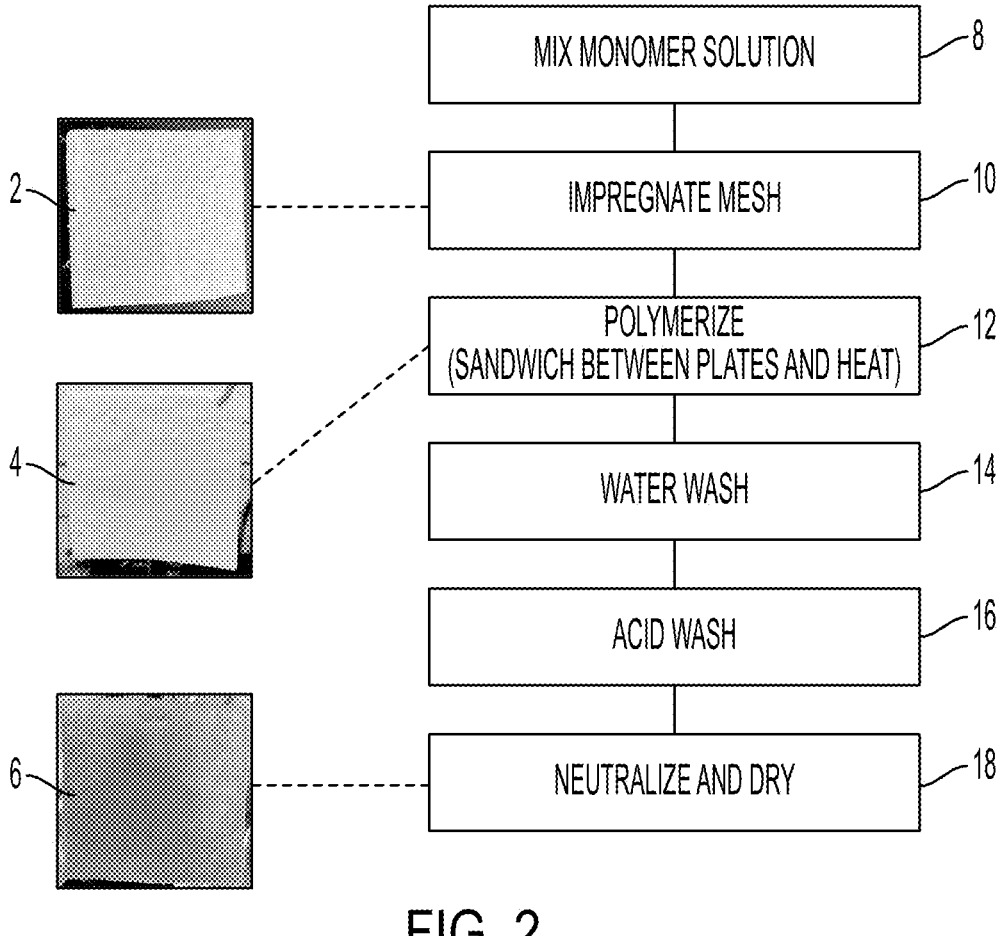

FIG. 2 shows an embodiment of the process in flowchart form with accompanying photographs of the mesh fabric at different stages. At 8, the monomer solution is mixed and at 10, the solution is impregnated into the bare mesh fabric 2. The impregnated fabric then undergoes heating to polymerize the solution at 12. In one embodiment, the polymerization occurs by placing the impregnated fabric between two plates and heating the plates. The plates may be substitutes with two sacrificial sheets, a single support plate, or a single sacrificial sheet.

The as-synthesized polymer aerogel fabric, shown at 4, then undergoes a water wash at 14 and an acid wash at 16. In one embodiment, the acid wash comprises a wash using HCl. After the acid wash, the ammonium-containing polymer aerogel monolith is neutralized at 18, such as by application of $NaHCO_3$, and dried. The amine-containing polymer aerogel monolith 6 is now ready for assembly into a direct air capture module or other adsorbent components.

The amine-containing aerogel monolith may comprise a cross-linking moiety and nitrogen-containing moiety resulting from the process. The nitrogen-containing moiety comprises an amine, which could be a primary or secondary amine. The cross-linking moiety may comprise divinylbenzene or any molecule with more than one vinyl group.

Figures 3, 4:
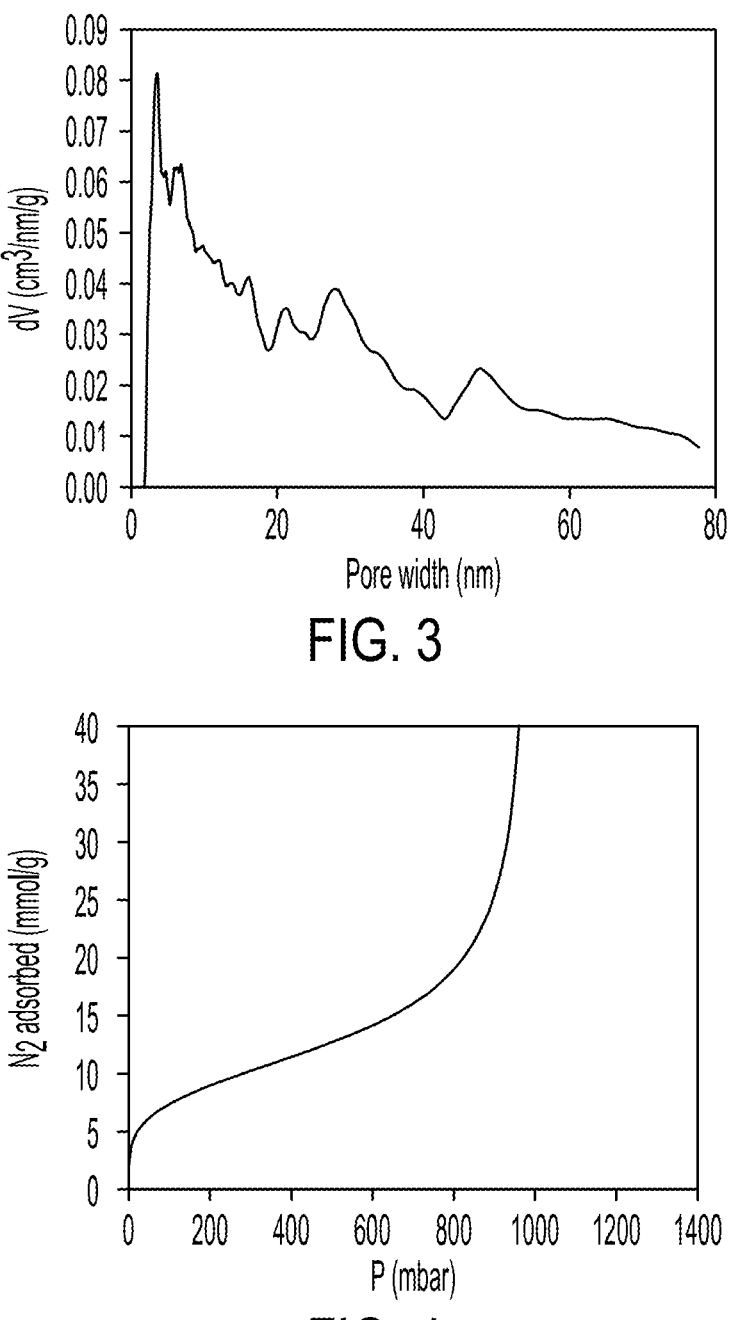
FIGS. 3-8 show graphs of characterization data for a polymer aerogel monolith.

The FIGS. 3-8 show graphs of various characterization results of the amine-containing polymer aerogel monolith. The results are from a thermogravimetric analysis of the polymer aerogel monolith under 410 ppm $CO_2$ in $N_2$ at 25° C. (regenerated under 100% $N_2$ at 100° C.). FIG. 3 shows a graph of pore density versus pore width. FIG. 4 shows a graph of nitrogen adsorbed versus pressure. The amine-containing aerogel was found to have a BET (Brunauer, Emmett and Teller) surface area of 768.31 m²/g, a pore volume of 1.941 cm³/g, and porosity of 57%.

Further characterization involves the elemental characterization and amine efficiency. The monolith was revealed to comprise carbon at 78.8 wt %, hydrogen at 10.6 wt %, nitrogen at 7.1 wt % and oxygen of 3.2 wt %. The table below shows other properties of the resulting amine-containing polymer aerogel.

| Property | Value | Unit |
|---|---|---|
| N loading | 7.20 | mol/kg |
| $CO_2$ adsorption @ 410 ppm | 0.90 | mol/kg |
| wt % amine | 13.8% | wt % |
| Amine efficiency | 12.3% | % |

The wt % amine assumes all the nitrogen from elemental characterization is attributable to amine.

Figure 5:
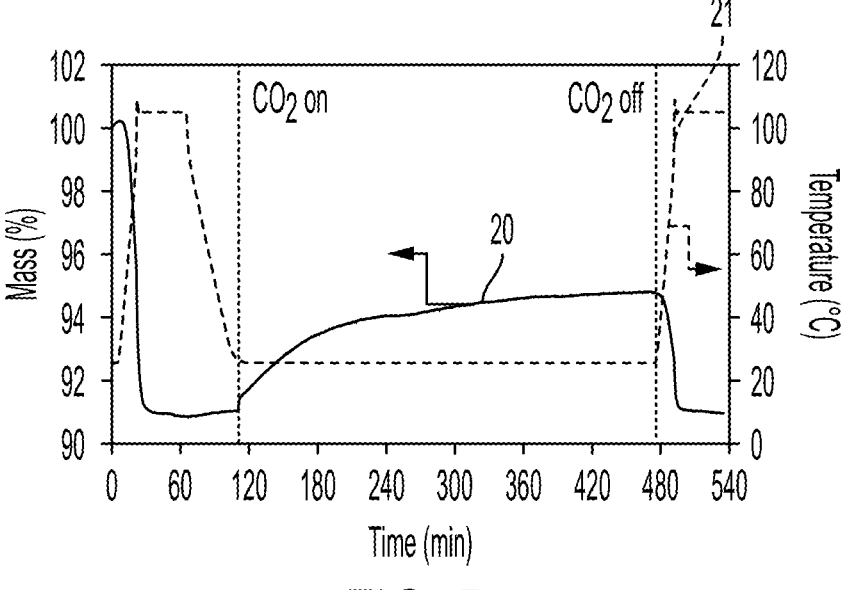
Figure 6:
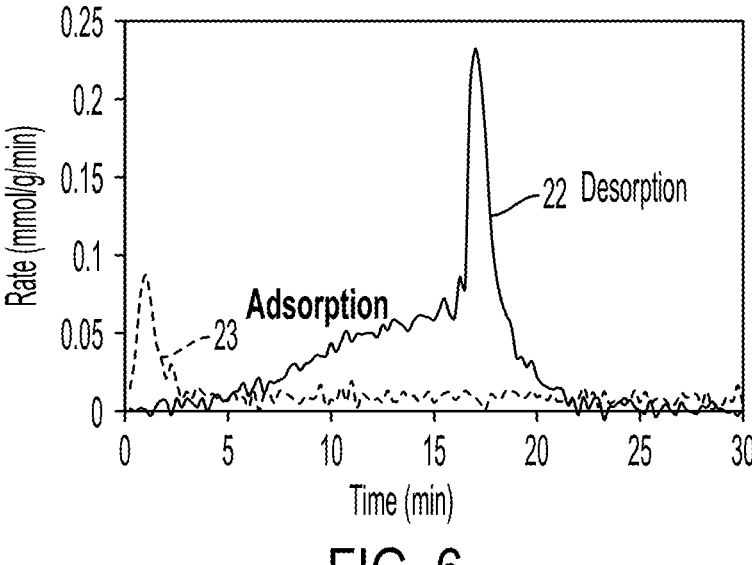
Figure 7:
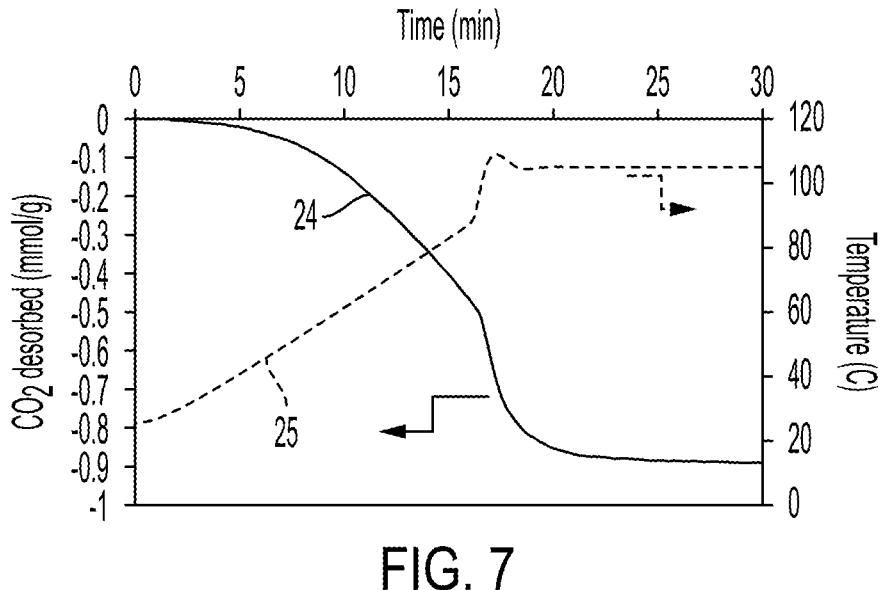
Figure 8:
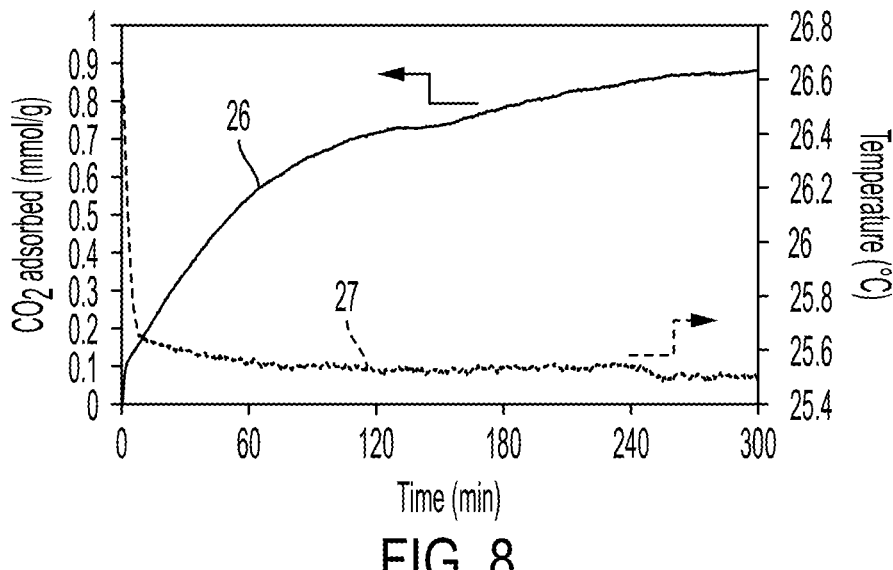

FIG. 5 shows a graph of mass fraction, curve 20, versus time, and temperature, curve 21. The lines "$CO_2$ on" and "$CO_2$ off" show the intervals when the $CO_2$ is present, and when it is just nitrogen. FIG. 6 shows the adsorption in curve 23 and desorption curve 22. The polymer aerogel monolith is configured to adsorb more than 0.36 mmol carbon dioxide/g monolith at 25° C. from a mixture containing 410 parts per million carbon dioxide. FIG. 7 shows the $CO_2$ desorbed as curve 24 and the temperature as curve 25, over 30 minutes. FIG. 8 shows desorption as curve 26 and the temperature curve 27 over 300 minutes.

The amine-containing polymer aerogel as a sheet provides flexibility in the shape of adsorbents and allows for easily replacement without having to replace the entire contactor. Generally, a direct air capture module will contain one or more monoliths arranged in a flow of gas, such as air. The module will also contain channels to allow the air to pass through the monolith, allowing the monolith to capture $CO_2$. The direct air capture module may take many different configurations enabled by the ease of configuring the polymer aerogel monolith.

Figure 9:
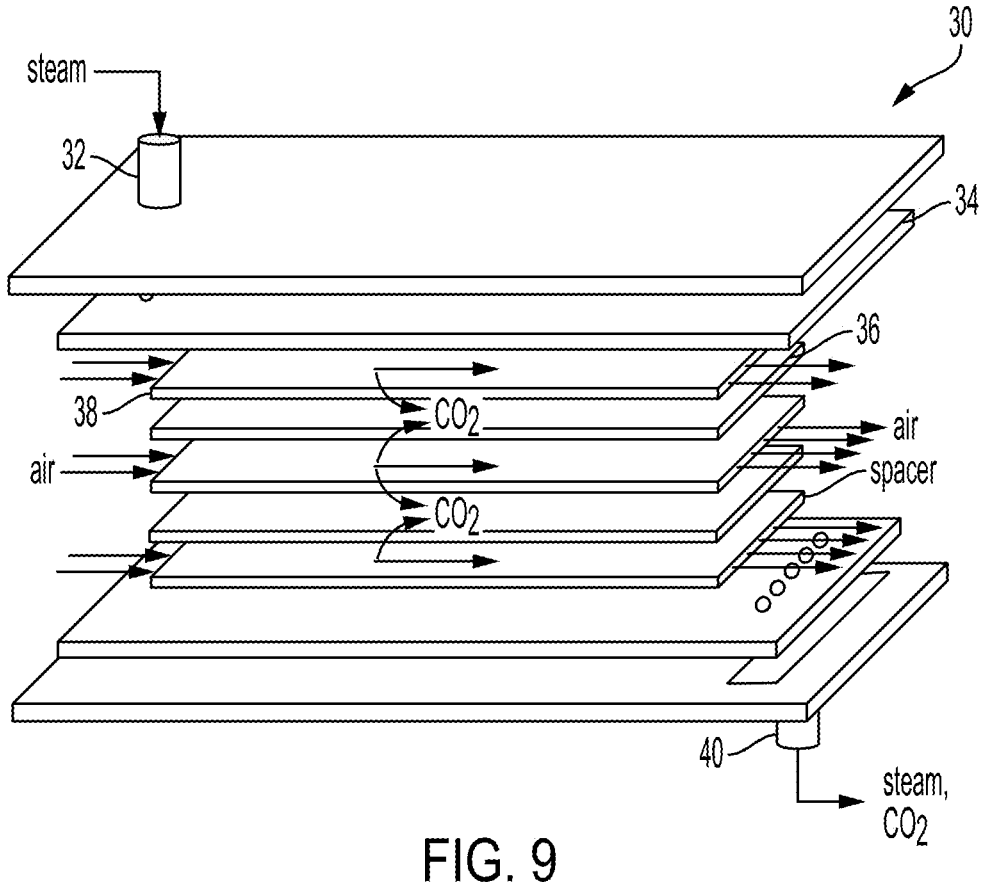
FIG. 9 shows an embodiment of a planar direct air capture module with steam regeneration.

In one embodiment, the monolith takes on a sheet form factor. FIG. 9 shows a planar direct air module 30 employing the amine-containing polymer aerogel as an adsorbent sheet, in a stacked sheet configuration. The module has a steam inlet 32 in a top plate, mirrored by an end plate at the bottom of the module. The end plate at the bottom has an outlet 40 that allows steam and $CO_2$ to exit the module. The plates have gaskets, such as 34. The module may have several monoliths such as 36 separated by separators, also referred to as spacers. This stacked sheet configuration makes up only one possible configuration.

Figure 10:
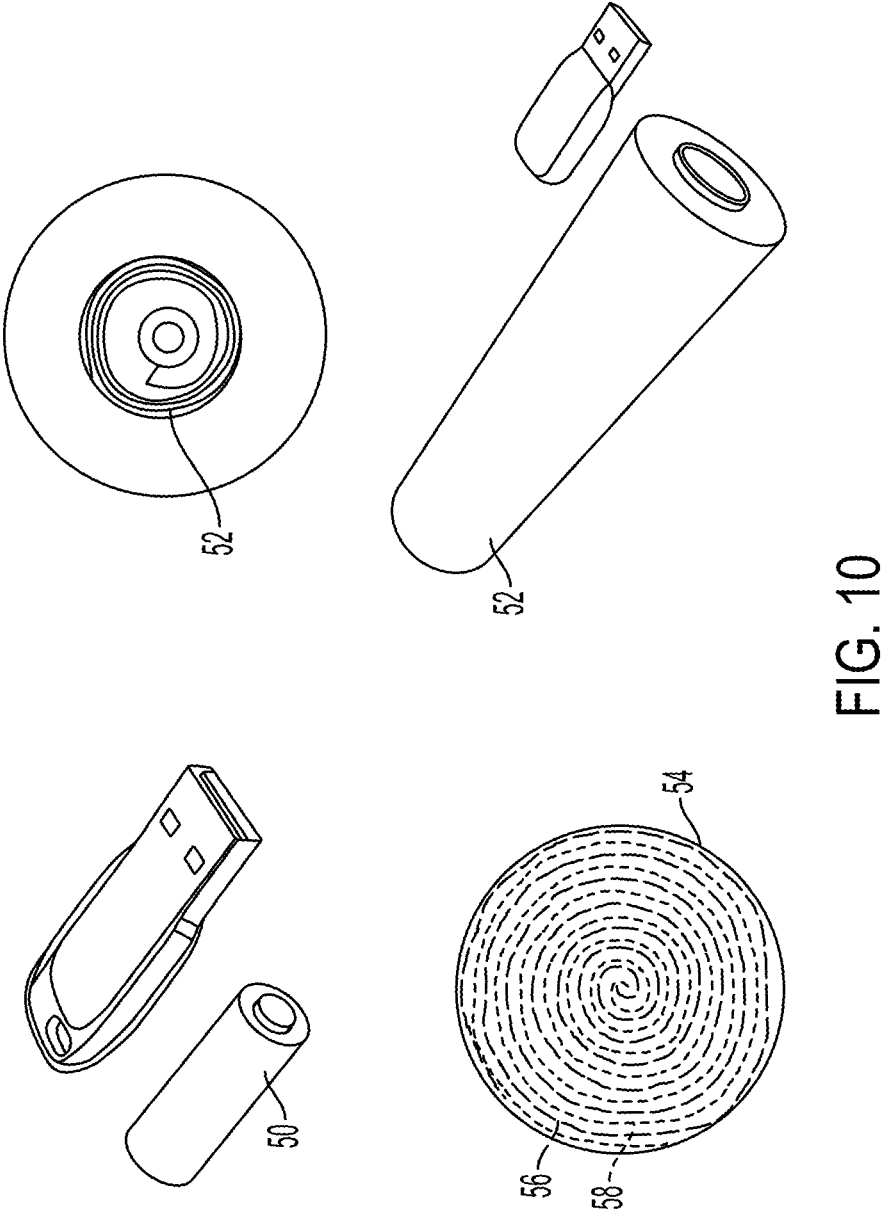
FIG. 10 shows embodiments of a spiral-wound polymer aerogel monolith.

Another configuration enabled by the adsorbent sheet form factor of the polymer aerogel comprises a spiral-wound configuration. FIG. 10 shows photographs of actual spiral wound monoliths 50 and 52. The thumb drives are shown for scale and demonstrate that they size range may vary widely. The left photograph of an embodiment of the module shows that the embodiment has a size approximately the same as a thumb drive. The photographs on the right show an alternative embodiment that is larger. The graphic shows the housing 54 of either embodiment. The spiral windings comprise the polymer aerogel monolith 56 and a separator or spacer 58. As a slight variation on the spiral wound configuration, the adsorbent sheets can also take the form of concentrically arranged cylinders.

Steam desorption offers a number of benefits to the DAC process, including enhancing the material stability by suppressing urea formation for example, by not allowing the material to be exposed to elevated temperature and $CO_2$ concentration at low relative humidity. Other benefits results from avoiding heating elements or other costly module components. The steam desorption acts as a heat transfer fluid and sweep gas, minimizes vacuum energy, and is compatible with a range of heat sources such as geothermal or solar-thermal, and electricity sources, such as solar and wind sources. The reinforced polymer aerogel monolith can withstand steam exposure without leaching or volatization of the amine, whereas for example, poly(ethylene imine) impregnated into solid oxides cannot.

Another embodiment provides a direct air capture module, comprising one or more polymer aerogel monolith, and one or more air flow channels. In some embodiments, the air flow channels are provided by the gap between the one or more polymer aerogel monoliths. In some embodiments, the one or more air flow channels are less than 5 millimeters in their shortest dimension, less than 3 millimeters in their shortest dimension, less than 2 millimeters in their shortest dimension, less than 1.5 millimeters in their shortest dimension, less than 1 millimeters in their shortest dimension. The shortest dimension of the air flow channels can be the distance between layers of the one or more polymer aerogel monoliths.

Figure 11:
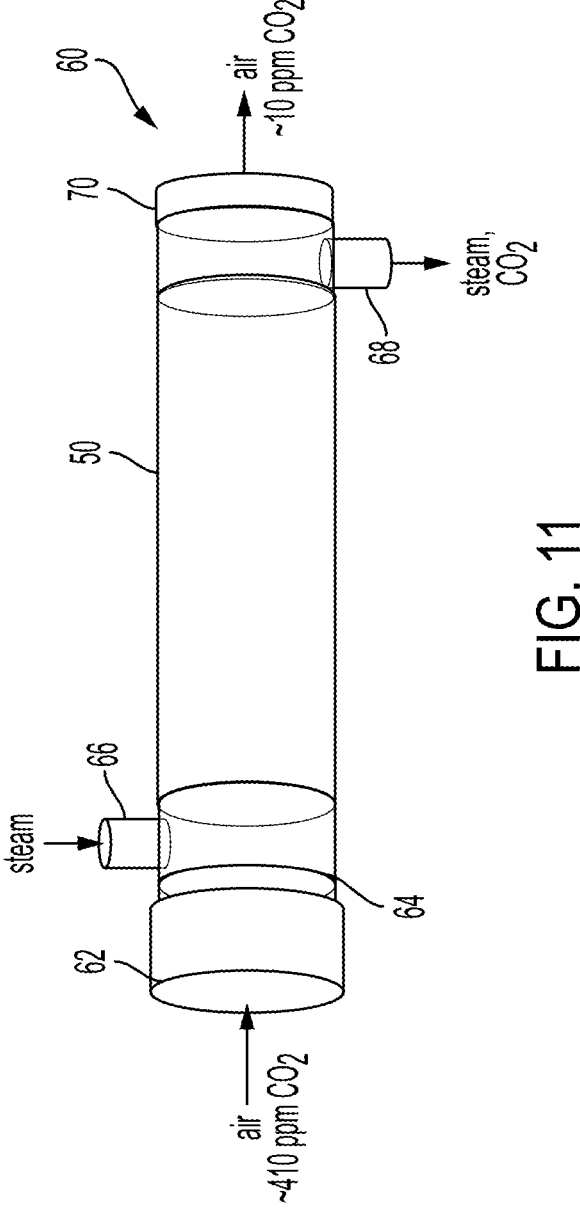
FIG. 11 shows embodiments of a spiral-wound direct air capture module with steam regeneration.

FIG. 11 shows an embodiment of a spiral-wound aerogel adsorbent polymer (SWAAP) module in a steam-regenerated direct air capture module. The spiral-wound module 50 (or 52) resides in a direct air capture module 60. Air enters the module assisted by a fan 62. A valve 64 opens and closes to control the airflow into the module. Steam enters the system through the steam inlet 66. As the air passes through the module, the monolith captures $CO_2$ from the air stream. The steam passes through the monolith and exits the module through the steam outlet 68 with the $CO_2$. Another valve 70 allows the air to exit the system, with the air having much less $CO_2$.

Figure 12:
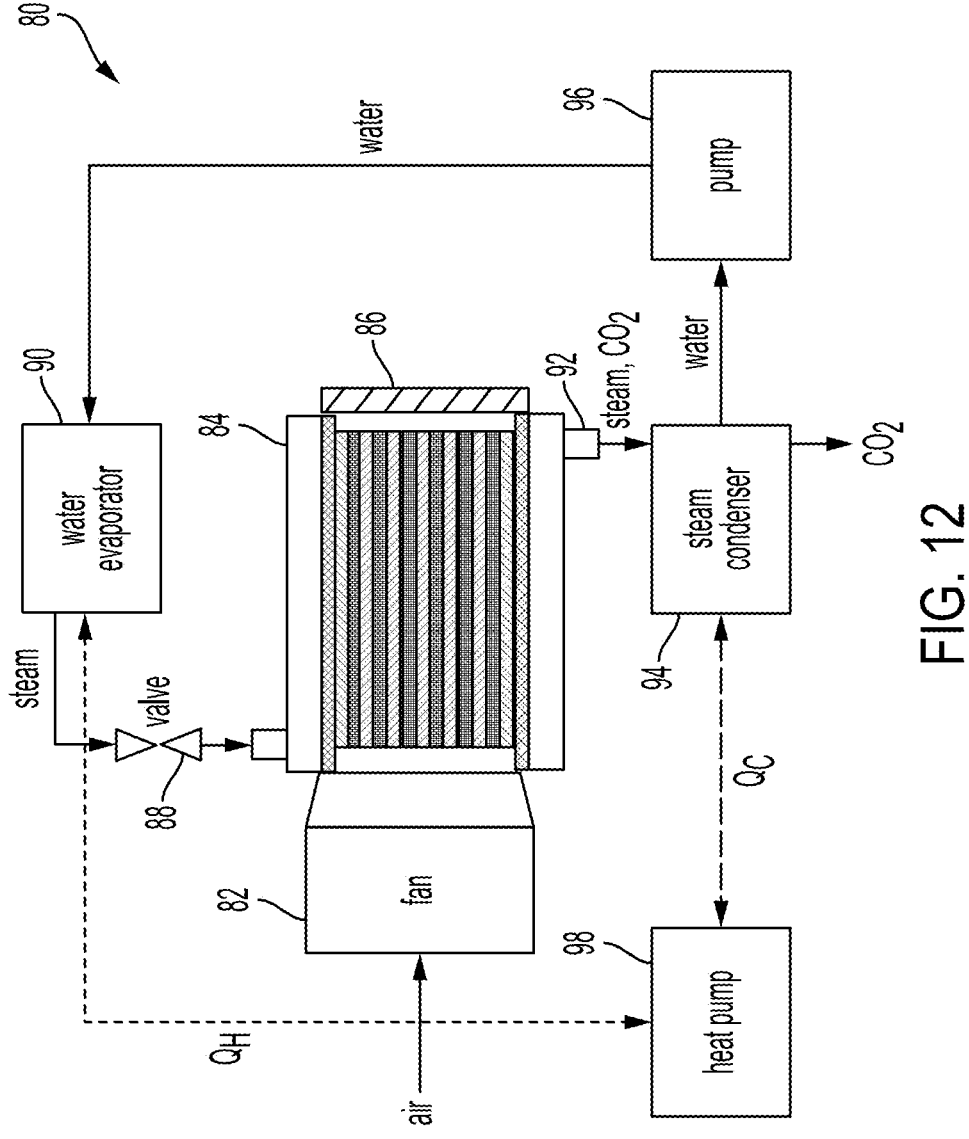
FIG. 12 shows an embodiment of a spiral direct air capture module with steam regeneration.

FIG. 12 shows an overall architecture for a steam-regeneration system 80 using the amine-containing polymer aerogel monolith in any configuration. Air enters the system assisted by the fan 82 that passes the air into the monolith 84. This causes the monolith to adsorb $CO_2$ from the air. The steam enters the system by way of the valve 88. As the steam passes through the monolith, it entrains the $CO_2$ that then passes out of the outlet 92. Shutter 86 controls the airflow on the outlet of the monolith. The steam that exits the monolith goes through a steam condenser 94 to allow the $CO_2$ to separate from the water. Pump 96 circulates the water to the water evaporator 90 to generate steam. A heat pump 98 controls the cooling of the steam condenser and the heating of the water evaporator. One should note that the specifics of the system may vary from the embodiments shown and no limitation to such specifics is intended nor should any be implied.

Figure 13:
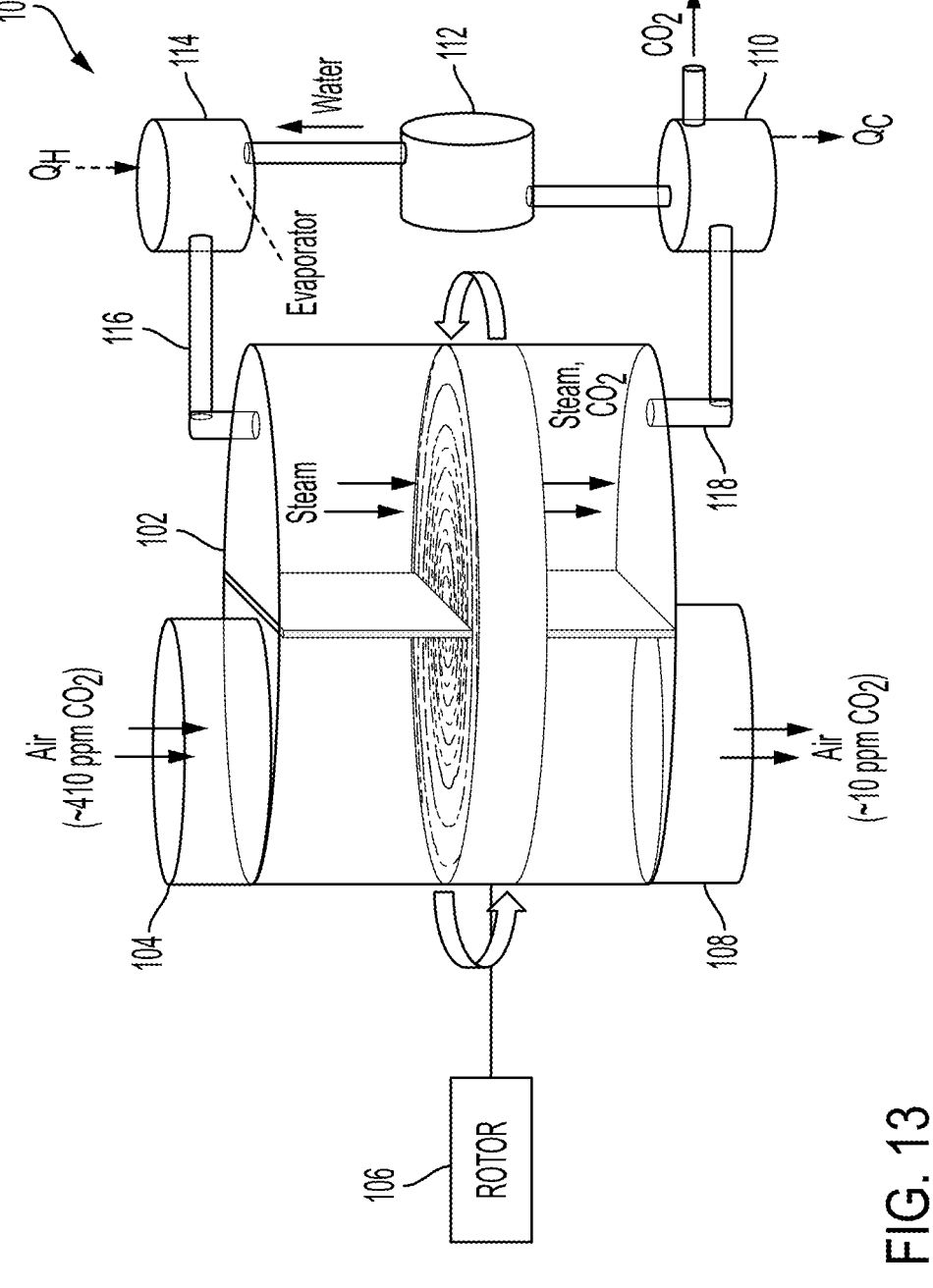
FIG. 13 shows an embodiment of a spiral or planar DAC module in a steam regeneration system.
Figure 14:
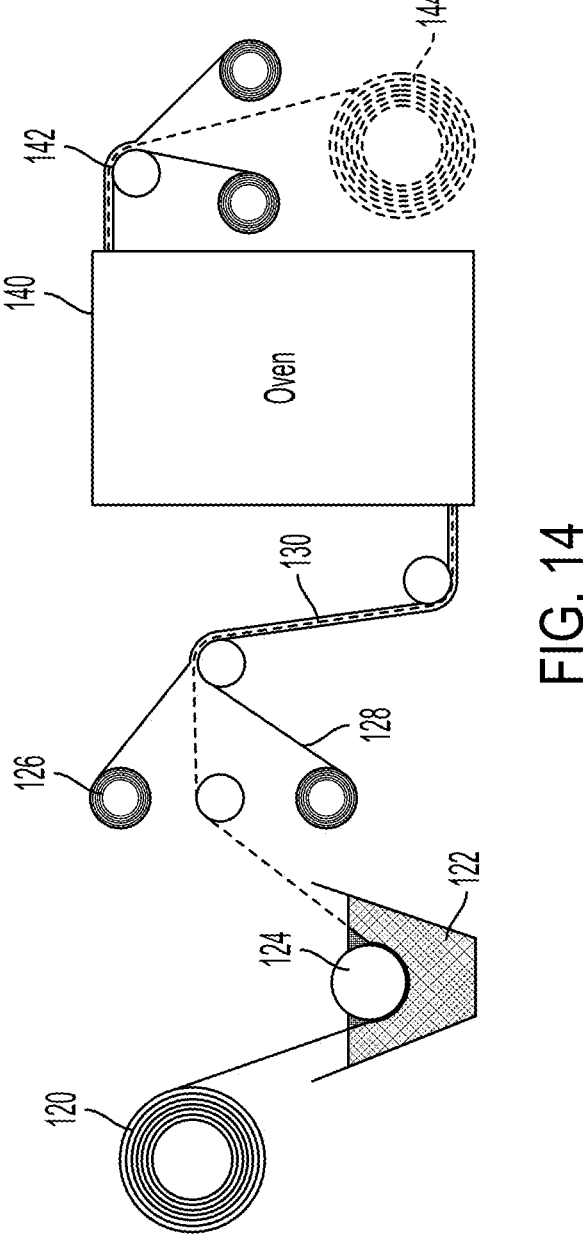
FIG. 14 shows an embodiment of a roll-to-roll manufacturing process for an amine-containing polymer aerogel monolith.

One embodiment of the spiral wound monolith may have a diameter greater than its length. The discussion here may refer to this as a "wheel-shaped" monolith. FIG. 13 shows an embodiment 100 of a direct air capture module in a steam regeneration system containing a wheel-shaped monolith. As mentioned above, the specifics of the overall system are provided to exhibit ways in which the module could be employed, not as any limitation on the use of the monolith.

Air enters the system through air inlet 104 and passes through the monolith 102 to allow the monolith to capture the $CO_2$. After passing through the monolith, the air exits the system at 108 with much lower $CO_2$ content. The wheel-shaped monolith 102 spins, powered by the rotor 106, to rotate through the airflow and the steam portion. As the monolith spins, the $CO_2$ laden monolith spins into the steam portion of the system. Steam enters the system at 116, passes through the monolith to release the $CO_2$ from the monolith into the steam and exits the system at 118. The condenser 110 condenses the steam and the $CO_2$ exits the condenser. Pump 112 circulates the water from the condenser to the evaporator 114. Application of heat to the evaporator 114 generates the steam used in the system.

Manufacture of the embodiments of amine-containing polymer aerogels may involve a roll-to-roll manufacturing process, allowing large-scale manufacturing of the monolith. FIG. 8 shows an embodiment of such a process. The roll 120 contains a roll of the woven or non-woven mesh material. The material moves under the impetus of several rollers. A roller 124 moves the material in and out of a bath of monomer-containing solution 122 resulting in a monomer-impregnated mesh. The solution 122 will contain the monomer and the initiator, such as those mentioned above vinylformamide and divinylbenzene.

A carrier material on rollers 126 and 128 then meet with the monomer-impregnated mesh to form a layered sandwich 130 of carrier material with the monomer-impregnated mesh between the two layers of carrier material. The layered material then travels into an over 140 that polymerizes the polymer solution and produces a polymer-impregnated mesh. The carrier sheets then separate from the polymer-impregnated mesh at 142 and produces an amide-containing polymer aerogel, possibly on a roll 144. The remaining processing to convert the amide-containing polymer to amine-containing polymer may occur in a continuous process after the formation of the amide-containing polymer mesh, or may occur in a batch process.

Regardless of the configuration of the system, generally the monoliths are used in a method to capture carbon dioxide from air. The method generally comprises positioning a direct air capture module in a flow of air, wherein the direct air capture module comprises an amine-containing polymer aerogel monolith, such that carbon dioxide from air adsorbs to the amine-containing polymer aerogel monolith. The method then positions the direct air capture module in a flow of steam, such that the adsorbed carbon dioxide is released into the flow of steam. The system then condenses the flow of steam into liquid water and collecting the carbon dioxide.

Example 1

A first example involves synthesis at 80° C. An organic monomer solution was prepared by mixing 2.5 g of divinylbenzene, 5 g of vinylformamide, 7.5 g of organic solvent, and 0.16 g of azobisisobutyronitrile (AIBN). A non-woven polypropylene mesh used has a thickness of 160 micrometers, areal density of 25-30 $g/m^2$, and a pressure drop of 31-34 $Pa/cm^2$. The non-woven polypropylene mesh was impregnated with the organic monomer solution to produce a monomer-impregnated mesh. The monomer impregnated mesh was sandwiched between two glass plates and heated at 80° C. for 1.5 hours to produce an as-synthesized, amide-containing reinforced polymer aerogel monolith. The amide-containing reinforced polymer aerogel monolith was worked-up by soaking in water, soaking in HCl, rinsing, soaking in $NaHCO_3$, rinsing, and drying to produce an amine-containing reinforced polymer aerogel monolith. The resulting material had an equilibrium adsorption of 0.36 mmol $CO_2/g$ at 410 ppm $CO_2$, balance $N_2$ (0% relative humidity), via thermogravimetric analysis.

Example 2

A second example involves synthesis at 60° C. An organic monomer solution was prepared by mixing 2.5 g of divinylbenzene, 5 g of vinylformamide, 7.5 g of organic solvent, and 0.09 g of azobisisobutyronitrile. A non-woven polypropylene mesh have properties in the same ranges as that in Example 1 was impregnated with the organic monomer solution to produce a monomer-impregnated mesh. The monomer impregnated mesh was sandwiched between two glass plates and heated at 60° C. for 24 hours to produce an as-synthesized, amide-containing reinforced polymer aerogel monolith. The amide-containing reinforced polymer aerogel monolith was worked-up by soaking in water, soaking in HCl, rinsing, soaking in $NaHCO_3$, rinsing, and drying, to produce an amine-containing reinforced polymer aerogel monolith. The resulting material had an equilibrium adsorption of 0.90 mmol $CO_2$/g at 410 ppm $CO_2$, balance $N_2$ (0% relative humidity), via thermogravimetric analysis (TGA).

Another embodiment of the aerogel comprises a poly (alkylamine-co-divinylbenzene) aerogel polymer, which may comprise poly(ethylamine-co-divinylbenzene). Poly (ethylamine-co-divinylbenzene) comprises ethylamine-segments and divinylbenzene segments. Poly(ethylamine-co-vinylbenzene) is a type of poly(alkylamine-co-divinylbenzene) wherein the alkyl-segment comprises two carbon atoms. Poly(ethylamine-co-vinylbenzene) can be produced by deprotecting poly(vinylformamide-co-divinylbenzene) using an aqueous acid or base. This aerogel is produced by using radical polymerization of divinylbenzene and vinylformamide, and then converting the amide moieties to amines via deprotection process using with aqueous acid. The alkyl-amine material has a high amine fraction and high amine efficiency for $CO_2$ adsorption. The of divinylbenzene and vinylformamide may be impregnated into mesh from solution prior to the polymerization, as in the embodiments above.

A method of capturing $CO_2$ using poly(alkylamine-co-divinylbenzene) aerogel polymer involves providing the aerogel polymer, such as in a mesh or just as a standalone polymer, exposing it to $CO_2$, causing the $CO_2$ to adsorb to the polymer. The $CO_2$ can then be desorbed from the polymer. This may involve many of the methods and systems discussed above.

Figures 15, 16:
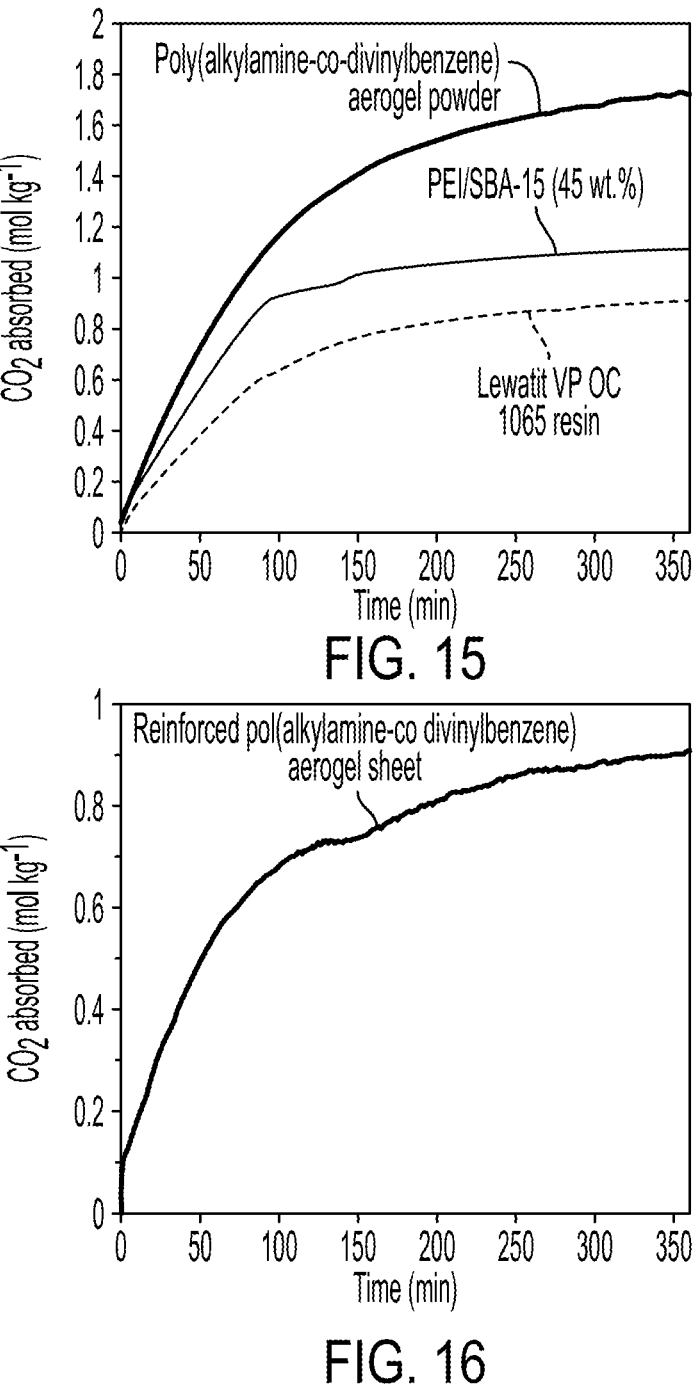
FIG. 15 shows a graph comparing CO₂ uptake of different materials.
FIG. 16 shows a graph of CO₂ uptake on a poly(alkylamine-co-divinylbenzene) aerogel sheet.

FIG. 15 shows a comparison of $CO_2$ uptake curves for the poly(alkylamine-co-divinylbenzene) aerogel polymer in powder form, poly(ethyleneimine-loaded silica (PEI/SB) and a commercial anion exchange resin, Lewatit VP OC 1065, which may contain benzylamine. The poly(alkylamine-co-divinylbenzene) aerogel achieves a 58% improvement over the current state-of-the-art, by thermogravimetric analysis under 410 ppm $CO_2$ and 25° C. under dry conditions.

FIG. 16 shows a $CO_2$ uptake curve on a reinforced poly(alkylamine-co-divinylbenzene) aerogel sheet, measured by thermogravimetric analysis under 410 ppm $CO_2$ and 25° C. under dry conditions, with 105° C. regeneration.

A differentiating feature of the polymer aerogel is its steam stability, due to the covalently bound amine functionality. Indeed, steam cycling improves the overall performance of the material. The material here incorporates a primary amine, making it less susceptible to urea formation. It is critical to tailor the DAC process to the adsorbent, hence the primary rationale for the chosen operating conditions, for example steam desorption, is to maximize chemical stability. Under TGA cycling, the inventor observed no loss of capacity over ten adsorption/desorption cycles.

The amine is covalently bound to the polymer network, so there is no amine volatility or loss of amine under steam exposure, as with conventional materials that consist of polyamines impregnated in a porous support, substrate or monolith. The mechanical stability of the structured adsorbent is exceptionally good. The aerogel monolith sheet can be rolled around a ⅛" diameter rod without any tearing, cracking, flaking, or any other degradation. This mechanical performance is in stark contrast to silica- or alumina-based monoliths, which tend to be brittle. Further, the mechanical robustness allows the aerogel monolith to be fabricated into a spiral-wound geometry, enabling novel structured adsorbent processes for DAC.

The embodiments provide an amine-containing polymer aerogel monolith in a sheet and methods of manufacture. The form factor of the monolith allows replacement of adsorbents without having to replace the entire air contactor when used in direct air capture modules. In addition, the monolith has the ability to form into various different configurations.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A polymer aerogel monolith comprising a polymer aerogel having a nitrogen content of greater than seven weight percent impregnated into a sheet of reinforcement material to form the polymer aerogel monolith as free-standing sheet.

2. The polymer aerogel monolith as claimed in claim 1, wherein the polymer aerogel comprises a cross-linking moiety and nitrogen-containing moiety.

3. The polymer aerogel monolith as claimed in claim 2, wherein the nitrogen-containing moiety comprises an amine.

4. The polymer aerogel monolith as claimed in claim 2, wherein the cross-linking moiety is at least one selected from the group consisting of: divinylbenzene, pentaerythritol tetraacrylate, pentaerythritol tetramethacrylate, pentaerythritol triacrylate, pentaerythritol trimethacrylate, polyoligosilsesquioxane acrylate, methacrylate, or vinyl derivatives, trimethylolpropane triacrylate, trimethylolpropane trimethacrylate, dipentaerythritol penta-acrylate, dipentaerythritol penta-methacrylate, dipentaerythritol hexa-acrylate, dipentaerythritol hexa-methacrylate, hexanedioldiacrylate, hexanediol-dimethacrylate, vinyl-containing crosslinkers derived from adamantane, di(trimethylolpropane) tetraacrylate, di(trimethylolpropane) tetramethacrylate, and any molecule containing two or more vinyl groups.

5. The polymer aerogel monolith as claimed in claim 3, wherein the amine is one of a primary amine or secondary amine.

6. The polymer aerogel monolith as claimed in claim 1, wherein the monolith is configured to adsorb more than 0.36 mmol carbon dioxide/g monolith at 25 degrees Celsius from a mixture containing 410 parts per million carbon dioxide.

7. The polymer aerogel monolith as claimed in claim 1, wherein the polymer aerogel has a Brunauer Emmett Teller (BET) surface area of greater than 20 $m^2$/g.

8. The polymer aerogel monolith as claimed in claim 1, wherein the mesh is a non-woven mesh.

9. The polymer aerogel monolith as claimed in claim 1, wherein the reinforcement material comprises polypropylene cloth.

10. The polymer aerogel monolith as claimed in claim 1, wherein the reinforcement material comprises less than 50 wt % of the monolith.

11. The polymer aerogel monolith as claimed in claim 1 wherein the polymer aerogel has a bend radius of less than 5 centimeters.

* * * * *